United States Patent [19]
Hancock et al.

[11] Patent Number: 4,916,574
[45] Date of Patent: Apr. 10, 1990

[54] PANELBOARD BUS BAR ARRANGEMENT

[75] Inventors: Drew S. Hancock, Marietta; Gregory P. Barner, Atlanta, both of Ga.

[73] Assignee: Siemens Energy & Automation, Inc., Alpharetta, Ga.

[21] Appl. No.: 362,117

[22] Filed: Jun. 6, 1989

[51] Int. Cl.⁴ .................... H01B 17/06; H02B 1/20
[52] U.S. Cl. .................... 361/361; 174/149 B; 361/355; 361/358; 439/212; 439/718
[58] Field of Search .................... 174/70 B, 71 B; 361/341, 346, 347, 350, 353, 355, 356, 357, 358, 361, 376; 439/114, 207, 209, 212, 215, 718

[56] References Cited

U.S. PATENT DOCUMENTS

| | | | |
|---|---|---|---|
| 4,142,225 | 2/1979 | Diersing et al. | 361/358 |
| 4,153,318 | 5/1979 | Bishop et al. | 339/22 |
| 4,242,718 | 12/1980 | Shariff et al. | 361/361 |
| 4,449,296 | 5/1984 | Luke et al. | 29/883 |
| 4,636,915 | 1/1987 | Perkins et al. | 361/355 |
| 4,733,329 | 3/1988 | Barner et al. | 361/355 |
| 4,740,865 | 4/1988 | Barner | 361/346 |

Primary Examiner—Gregory D. Thompson
Attorney, Agent, or Firm—Volker R. Ulbrich; James G. Morrow

[57] ABSTRACT

A panelboard bus bar arrangement. The arrangement includes an insulating base pan which is supported upon a steel base pan. The arrangement also includes three bus bars positioned within the insulating base ban and arranged side-by-side in a parallel manner. The distance between the bus bars is maintained relatively small by using an insulating member which shields and insulates the bus bars from each other. The insulating member includes openings which expose only portions of the bus bars, and dividers which separate adjacent openings and increase the cross surface distance between the openings. By increasing the cross surface distance between openings, arcing is inhibited between the openings.

10 Claims, 4 Drawing Sheets

PANELBOARD BUS BAR ARRANGEMENT

BACKGROUND OF INVENTION

This invention generally relates to an electrical panelboard. More specifically, this invention relates to a combination of an insulating base pan and bus bars.

As with many electrical apparatus, a common goal is to reduce the size of the apparatus without reducing the voltage and current ratings of the apparatus. Additionally, when the size and/or configuration of an apparatus are modified, standards such as Underwriter Laboratory standards must be met. For example, in a three phase load center the bus bars must be spaced such that arcing in avoided between the bus bars at the rated voltage and current of the load center.

One mode of arcing between the bus bars of a multiphase system is in the form of an arc which follows a path along the surfaces of the base pan supporting the bus bars. To prevent this type of arcing, minimum "cross surface clearances" are required between bus bars for a given voltage and current rating. In general, the "cross surface clearance" is the distance between the bus bars measured along a path lying upon the base pan, wherein the path is substantially perpendicular to the bus bars. Accordingly, if the width of a base pan supporting parallel bus bars is to be reduced, steps must be taken so that the cross surface clearances between the bus bars are adequate.

SUMMARY OF THE INVENTION

An object of the present invention is to provide an assembly for supporting bus bars such that the distance between the bus bars can be reduced while also maintaining the cross surface clearance between the bus bars.

Accordingly, there is provided a panelboard including an insulative base pan, a first electrical conductor, a second electrical conductor, a third electrical conductor, an insulating shield member, and means for fastening the insulating shield member to the base pan. The insulative base pan defines a top surface and a bottom surface, wherein the top surface defines a first channel and a second channel and the bottom surface defines a third channel which includes openings passing through the base pan. The channels are substantially parallel and the third channel is intermediate the first channel and the second channel. The electrical conductors are positioned within the channels, and the third electrical conductor is positioned within the third channel and contained within the third channel by an insulating means. The insulating shield member mounts to the top surface of the base pan and provides insulation between the electrical conductors. Openings are provided in the insulating shield member for accessing the electrical conductors, and dividers are provided between the adjacent openings.

An advantage of the present invention is that some of the components of the assembly can be molded efficiently and in a cost effective manner. Another advantage of the invention is that its manufacture can be easily automated.

Various other objects and advantages of the present invention will become apparent from the following description, with reference to the accompanying drawing.

DETAILED DESCRIPTION OF THE PREFERRED EMBODIMENT

Figure 1:
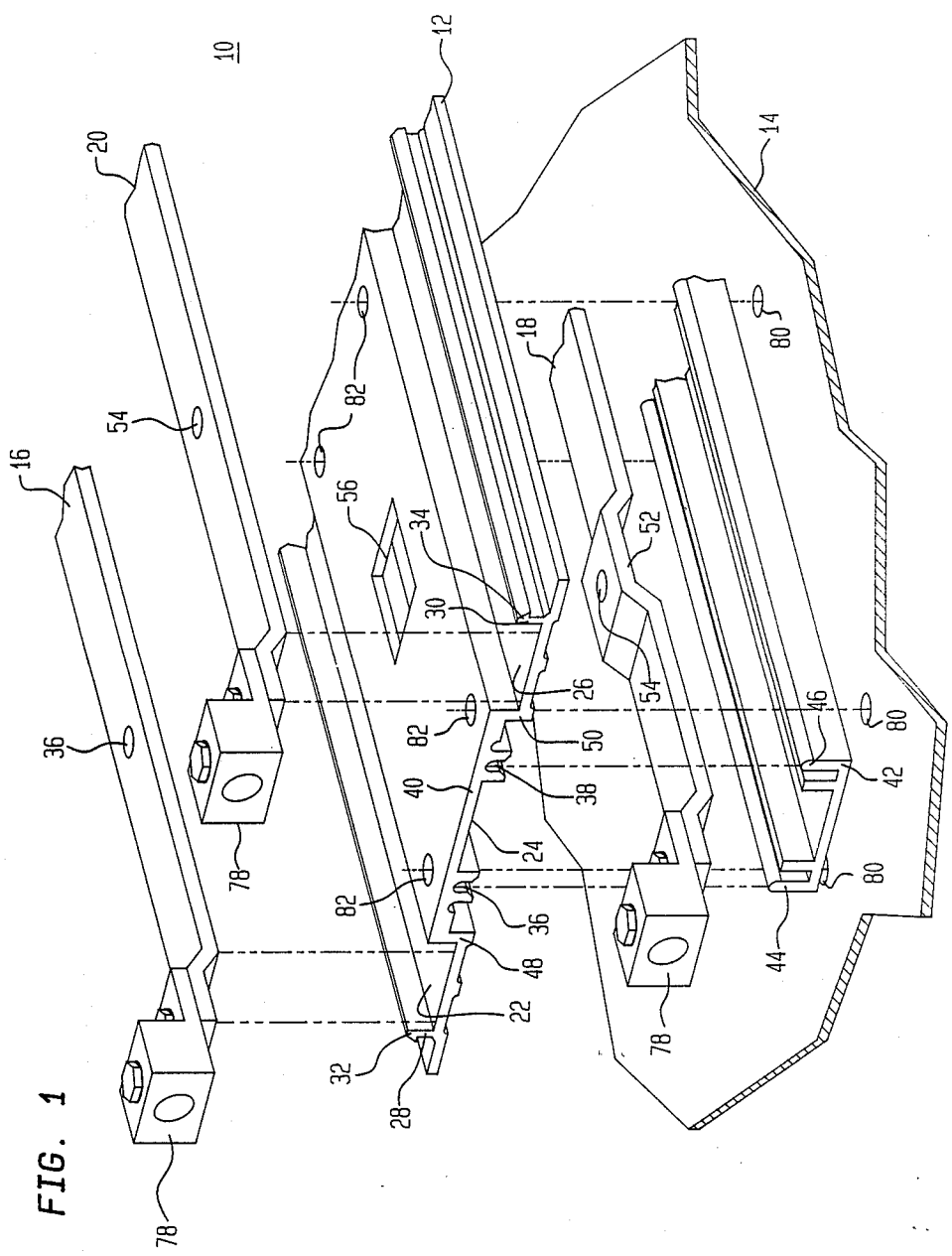
FIG. 1 illustrates an exploded top view of the panelboard base pan and bus bar assembly.

Referring to the drawings, FIG. 1 illustrates the primary components of the preferred embodiment of the panelboard base pan and bus bar assembly 10. The main structural components of the assembly are an insulating base pan 12 and a steel pan 14. The insulating base pan 12 serves to support the bus bars 16, 18, 20 and insulate the bus bars 16, 18, 20 from each other. The steel pan 14 is used to support the whole assembly for purposes of manufacturing and ultimately mounting the assembly within a panelboard enclosure. By way of example, the bus bars 16, 18, 20 can be manufactured from copper or aluminum.

Figure 2:
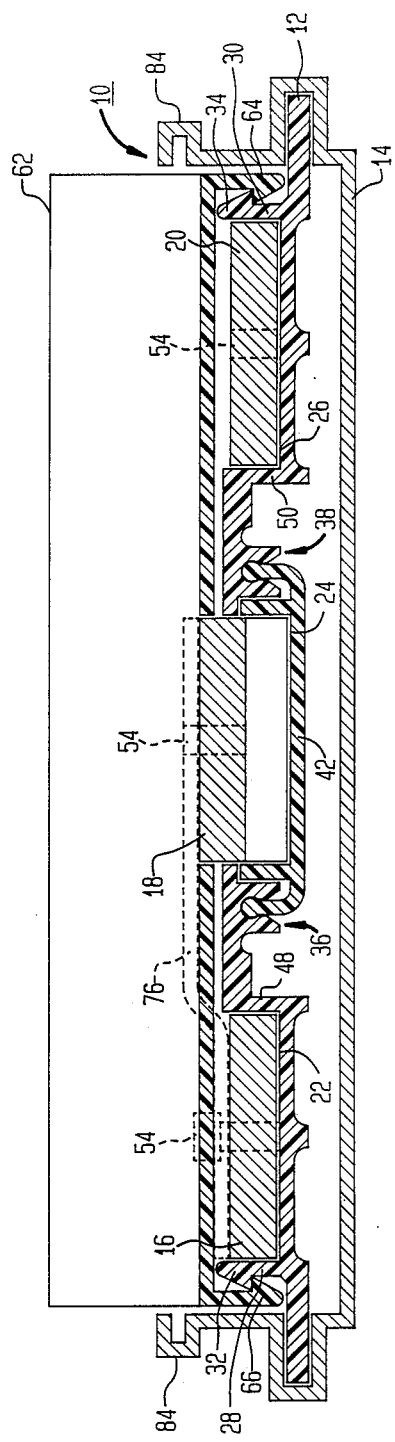
FIG. 2 is an end view of the assembly taken along line 2—2 of FIG. 4.

Referring to FIG. 2, the insulating base pan 12 is fabricated to include 3 parallel channels 22, 24, 26 each adapted to receive a bus bar. The two outside channels 22, 26 are each formed between an end formation 48, 50 and an outside wall 28, 30. The outside walls 28, 30 each include hook portions 32, 34, the function of which will be discussed below. By way of example, the base pan 12 can be extrusion molded from Prevex ® manufactured by General Electric.

The inside channel 24 is formed between two snap formations 36, 38 and the center portion 40 of the base pan 12. An insulating member 42 is provided to cooperate with the inside channel 24 such that the second bus bar 18 is contained within the channel 24. Engagement formations 44, 46 are provided along each side of the insulating member 42. These formations 44, 46 are designed to engage the snap formations 36, 38 such that the insulating member 42 is fastened in place.

Referring to FIG. 1 again, the second bus bar 18 is shown as including raised formations 52 which include a threaded hole 54. The first and second bus bars 16, 20 include threaded holes 54, without the raised formations. The basis for this difference between the bus bars is the placement of the bus bars relative to the base pan 12. Since the second bus bar 18 is located below the base pan 12, the formation 52 serves to extend the portions of the bus bar 18 including the holes 54 through openings 56 in the center portion 40 of the base pan 12.

Figure 3:
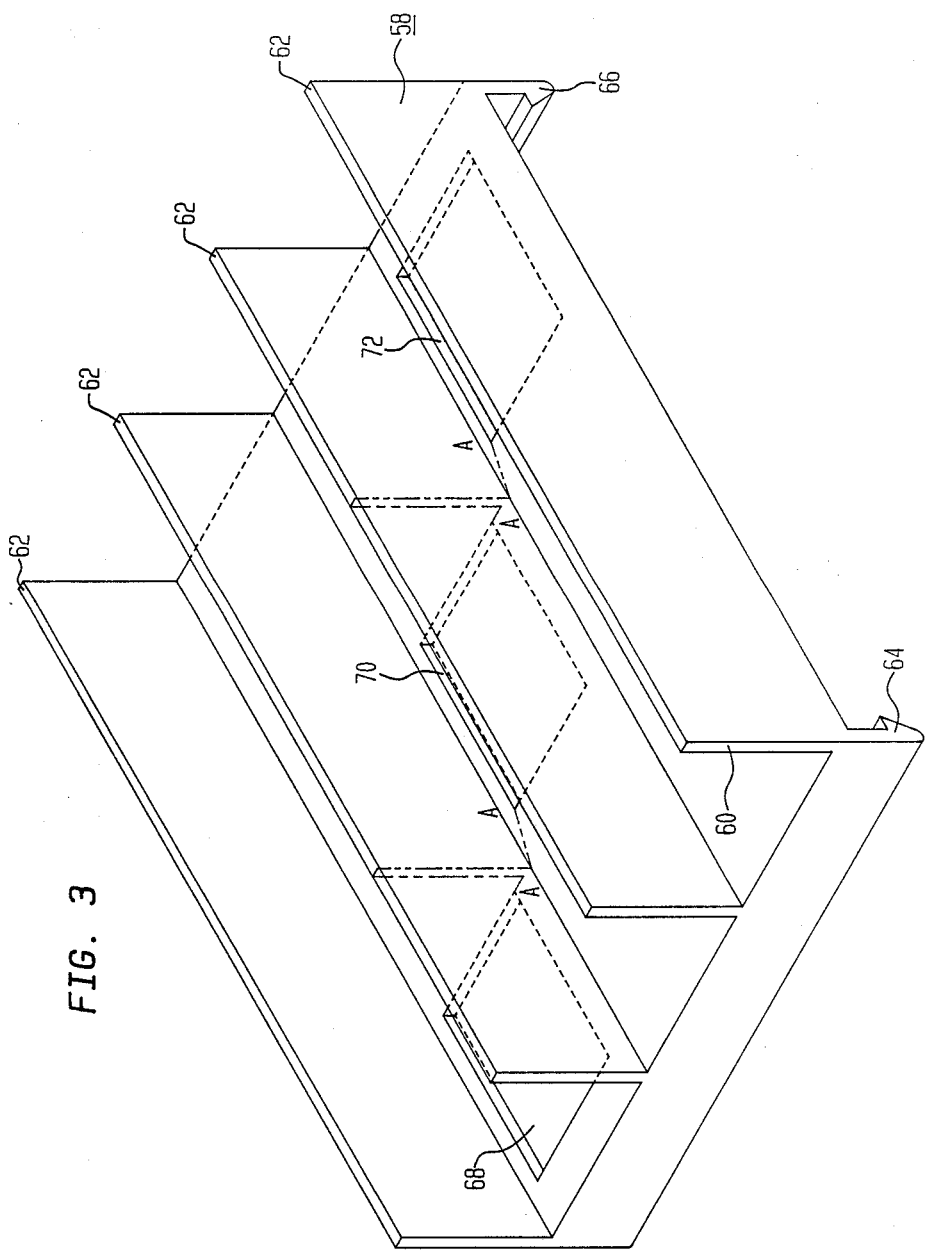
FIG. 3 illustrates a perspective view of a bus bar shield.

FIG. 3 illustrates the bus bar shield 58. The shield 58 includes a shield body 60, four dividers 62, and two hooking portions 64, 66. The body 60 includes three staggered openings 68, 70, 72. Each opening provides access to a threaded hole 54 of a bus bar. The dividers 62 are arranged upon the body 60 such that a divider 62 is located between each adjacent opening 68, 70, 72. By arranging the dividers 62 in this manner, the cross surface clearance between the portions of the bus bars 16, 18, 20 exposed by the openings 68, 70, 72 can be greatly increased. This provides shielding and insulation between the bus bars 16, 18, 20. Accordingly, even though the bus bars 16, 18, 20 are arranged relatively close, arcing between the bus bars 16, 18, 29 is suppressed even though the bus bars are not provided with an insulating coating or wrap. (The path A—A illustrates the cross surface clearance between two of the exposed bus bars 16, 18, 20.)

The hooking portions 64, 66 are arranged along the sides of the body 60 substantially perpendicular to the dividers 62. These portions 64, 66 are designed to engage the hook portions 32, 34 of the base pan 12 such that the shield 58 is secured to the base pan 12.

Figure 4:
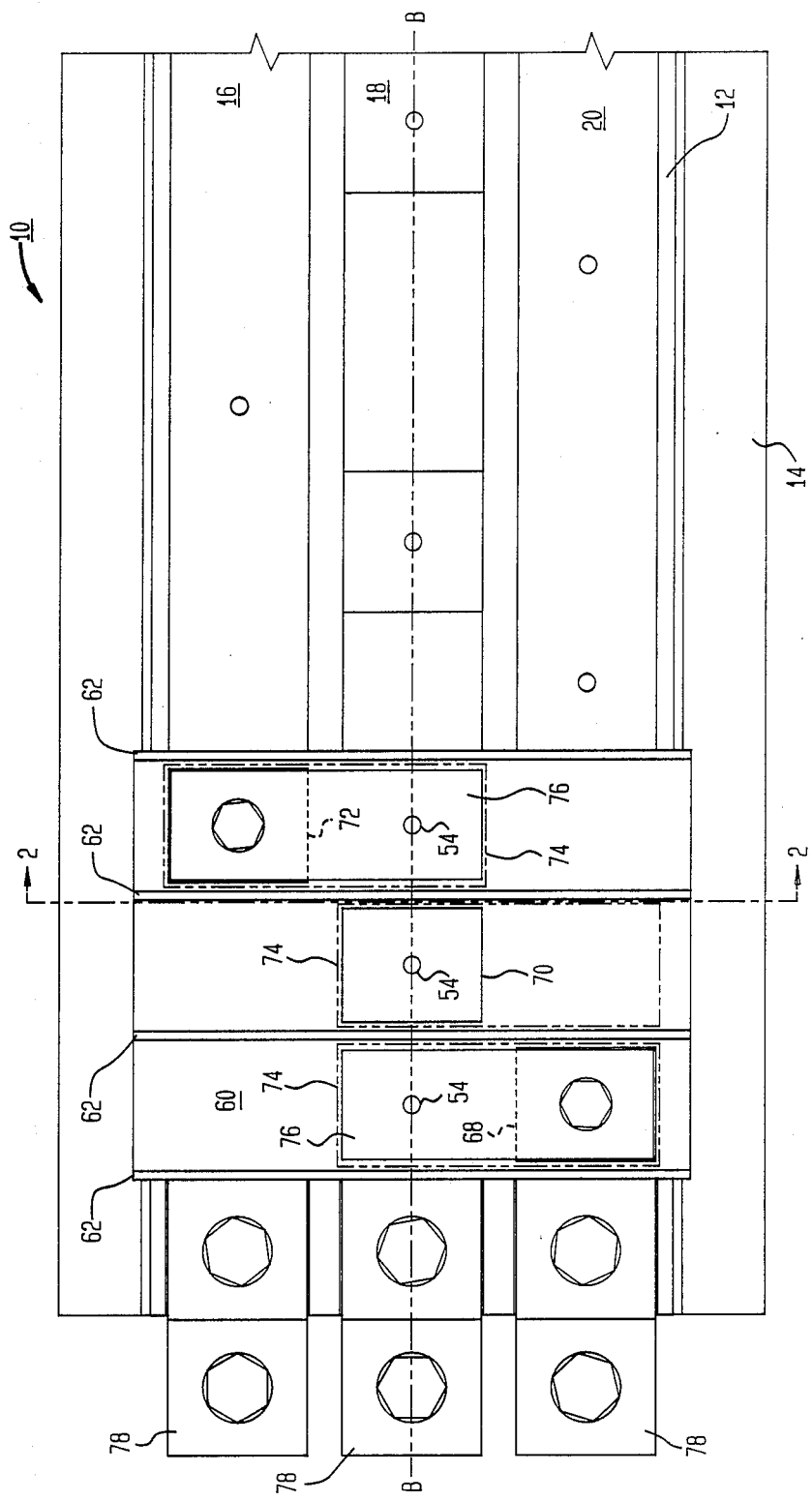
FIG. 4 is a top view of the assembly.

The raised formations 52 of the second bus bar 18 were described above as being sized such that the formations 52 project through the openings 56. In addition to projecting through the openings 56, the formations 52 also project through the openings 70 such that the top surface of the formation 52 is raised slightly above the top surface of the body 60. By configuring the formations 52 in this way, a circuit breaker 74 can be directly mounted to the bus bar 18 as illustrated in FIG. 4. (For purposes of clarity, the circuit breakers 74 have been shown schematically as a rectangle with a dashed outline. Additionally, only one bus bar shield 58 has been shown, but it should be understood that a plurality of shields can be snapped onto the pan 12 for purposes of shielding the remaining exposed portions of the bus bars 16, 18, 20.)

To coupled circuit breakers 74 to the first and third bus bars 16, 20, centering straps 76 are provided with threaded holes lying along the center line B—B of the second bus bar 18. These centering straps 76 can be insulated with a wrap or coating so that the cross surface clearance between the bus bars 16, 18, 20 is maintained. All three of the bus bars 16, 18, 20 can be provided with lugs 78 for coupling wires or other conductors to the bus bars 16, 18, 20.

In FIG. 1, the insulating base pan 12 and the steel base pan 14 are shown as including openings 80, 82. These openings 80, 82 are designed to accept fasteners which fasten the insulating base pan 12 to the steel base pan 14. When the insulating base pan 12 is fastened to the steel base pan 14, the steel base pan 14 provides a support for the free ends of the circuit breakers 74. More specifically, each side of the steel base pan 14 is provided with a hooking arrangement 84 adapted to engage the free end of a circuit breaker 74.

While one embodiment of the arrangement has been shown and described in detail herein, various other changes and modifications may be made without departing from the scope of the present invention. For example, it is not necessary that the arrangement be used with three bus bars. Additionally, when the arrangement is used with three bus bars, the three bus bars do not have to be used for three phases of power. For example, the center bus bar could be used as a neutral.

We claim:

1. A panelboard comprising:
    an insulative base pan defining a top surface and a bottom surface, the top surface defining a first channel and a second channel and the bottom surface defining a third channel which includes openings passing through the base pan, wherein the first and second channels are substantially parallel and the third channel is intermediate the first channel and the second channel;
    a first electrical conductor positioned within the first channel;
    a second electrical conductor positioned within the second channel;
    a third electrical conductor positioned within the third channel;
    insulating means containing the third electrical conductor within the third channel;
    an insulating shield member mountable to the top surface of the base pan providing insulation between the electrical conductors, the insulating shield member including a first opening to gain access to the first electrical conductor, a second opening to gain access to the second electrical conductor, a third opening to gain access to the third electrical conductor, a first divider separating the first opening from the second opening, and a second divider separating the second opening from the third opening; and
    means fastening the insulating shield member to the base pan.

2. The panelboard of claim 1, wherein the first, second and third electrical conductors are bus bars having generally rectangular cross-sections, the third electrical conductor including at least one formation which extends through one of the openings in the base pan and an opening in the insulating shield member.

3. The panelboard of claim 2, wherein the means fastening the insulating shield member to the base pan comprises hooking portions upon the insulating shield member engageable with hooking portions upon the base pan.

4. The panelboard of claim 3 further comprising a metal base pan, and means attaching the metal base pan to the insulative base pan.

5. The panelboard of claim 4, wherein each bus bar includes means coupling a respective bus bar to a circuit breaker.

6. A bus bar arrangement comprising:
    a first bus bar having a substantially rectangular cross-section;
    a second bus bar having a substantially rectangular cross-section;
    a third bus bar having a substantially rectangular cross-section;
    an insulative base pan including a first generally U-shaped channel containing the first bus bar, a second generally U-shaped channel containing the second bus bar, and a third generally U-shaped channel containing the third bus bar, wherein the first and second channels are substantially parallel and the third channel is intermediate the first channel and the second channel;
    insulating means containing the third electrical conductor within the third channel;
    an insulating shield member mountable to the base pan providing insulation between the electrical conductors, the insulating shield member including a first opening to gain access to the first electrical conductor, a second opening to gain access to the second electrical conductor, a third opening to gain access to the third electrical conductor, a first divider separating the first opening from the second opening, and a second divider separating the second opening from the third opening; and
    means fastening the insulating shield member to the base pan.

7. The bus bar assembly of claim 6, wherein the first and second channels are open upwardly and the third channel is open downwardly.

8. The bus bar assembly of claim 7, wherein the means fastening the insulating shield member to the base pan comprises hooking portions upon the insulating shield member engageable with hooking portions upon the base pan.

9. The bus bar assembly of claim 8 further comprising a metal base pan, and means attaching the metal base pan to the insulative base pan.

10. The bus bar assembly of claim 9, wherein each bus bar includes means coupling a respective bus bar to a circuit breaker.

* * * * *